US009134975B1

(12) United States Patent
Beavin et al.

(10) Patent No.: US 9,134,975 B1
(45) Date of Patent: Sep. 15, 2015

(54) DETERMINING WHICH COMPUTER PROGRAMS ARE CANDIDATES TO BE RECOMPILED AFTER APPLICATION OF UPDATES TO A COMPILER

(71) Applicant: International Business Machines Corporation, Armonk, NY (US)

(72) Inventors: Thomas A. Beavin, Milpitas, CA (US); David R. Moy, Los Altos, CA (US); Terence P. Purcell, Springfield, IL (US); John B. Tobler, San Jose, CA (US); Nigel G. Slinger, Los Gatos, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/466,585

(22) Filed: Aug. 22, 2014

(51) Int. Cl.
    *G06F 9/45* (2006.01)
(52) U.S. Cl.
    CPC . *G06F 8/41* (2013.01); *G06F 8/443* (2013.01)
(58) Field of Classification Search
    CPC .................................. G06F 8/41; G06F 8/443
    USPC .................................................. 717/140, 154
    See application file for complete search history.

(56) References Cited

U.S. PATENT DOCUMENTS

| 6,081,655 A * | 6/2000 | Carter et al. ................... 717/130 |
| 2007/0061790 A1 * | 3/2007 | Kay et al. ....................... 717/145 |
| 2010/0257515 A1 * | 10/2010 | Bates et al. .................... 717/145 |
| 2010/0325619 A1 | 12/2010 | Song et al. |
| 2012/0317440 A1 | 12/2012 | Towle et al. |
| 2013/0159122 A1 * | 6/2013 | Biswas et al. ................ 705/26.1 |

OTHER PUBLICATIONS

C. Szyperski, "Component Technology—What, Where, and How?"*
"Comparison Checking for Validation of Compiler Output when Changes to the Supported Machine Architecture are activated", IP.com Prior Art Database, Technical Disclosure IPCOM000192881D, Feb. 5, 2010, IBM, 2 pg.

* cited by examiner

*Primary Examiner* — Phillip H Nguyen
(74) *Attorney, Agent, or Firm* — Cuenot, Forsythe & Kim, LLC

(57) ABSTRACT

Source code of a computer program is compiled by a compiler to generate object code. During compilation of the source code, for each function of the source code compiled, an identifier indicating the function can be entered into a module entry point list. An update for the compiler is received. Responsive to receiving the compiler update, a determination is made, by processing the module entry point list, whether any of the functions of the source code were compiled at least one compiler module to be changed by the compiler update. Responsive to determining that at least one of the functions of the source code was compiled by a compiler module to be changed by the compiler update, a determination is made that the source code of the computer program is a candidate to be recompiled with an updated version of the compiler having the compiler update applied.

20 Claims, 3 Drawing Sheets

DETERMINING WHICH COMPUTER PROGRAMS ARE CANDIDATES TO BE RECOMPILED AFTER APPLICATION OF UPDATES TO A COMPILER

BACKGROUND

The present invention relates to computer programming, and more specifically, to compilation of program code.

Computer programs oftentimes are written in high-level programing languages. In contrast to low-level programming languages, such as assembly language, high-level programing languages are much more intuitive to computer programmers, oftentimes using natural language elements. Rather than dealing with registers, memory addresses and call stacks, high-level programing languages deal with variables, arrays, objects, expressions, functions and other computer science concepts, with a focus on usability. Accordingly, writing computer programs in a high-level programing language is much easier and, from the standpoint of actually writing the program code, more efficient for the computer programmer.

SUMMARY

A method includes compiling, using a compiler, a first source code of a first computer program to generate a first object code and, during compilation of the first source code, for each function of the first source code compiled by the compiler, entering into a first module entry point list an identifier indicating the function. The method also includes receiving an update for the compiler. The method also includes, responsive to receiving the update for the compiler, determining, using a processor processing the first module entry point list associated with the first computer program, whether any of the functions of the first source code were compiled by at least one compiler module to be changed by the update for the compiler. The method further includes, responsive to determining that at least one of the functions of the first source code was compiled by the at least one compiler module to be changed by the update for the compiler, determining that the first source code of the first computer program is a candidate to be recompiled with an updated version of the compiler having the update for the compiler applied.

A system includes a processor programmed to initiate executable operations. The executable operations include compiling, using a compiler, a first source code of a first computer program to generate a first object code and, during compilation of the first source code, for each function of the first source code compiled by the compiler, entering into a first module entry point list an identifier indicating the function. The executable operations also include receiving an update for the compiler. The executable operations also include, responsive to receiving the update for the compiler, determining, by processing the first module entry point list associated with the first computer program, whether any of the functions of the first source code were compiled by at least one compiler module to be changed by the update for the compiler. The executable operations further include, responsive to determining that at least one of the functions of the first source code was compiled by the at least one compiler module to be changed by the update for the compiler, determining that the first source code of the first computer program is a candidate to be recompiled with an updated version of the compiler having the update for the compiler applied.

A computer program includes a computer readable storage medium having program code stored thereon. The program code is executable by a processor to perform a method. The method includes compiling, using a compiler executed by the processor, a first source code of a first computer program to generate a first object code and, during compilation of the first source code, for each function of the first source code compiled by the compiler, entering into a first module entry point list an identifier indicating the function. The method also includes receiving, by the processor, an update for the compiler. The method also includes, responsive to receiving the update for the compiler, determining, by the processor processing the first module entry point list associated with the first computer program, whether any of the functions of the first source code were compiled by at least one compiler module to be changed by the update for the compiler. The method further includes, responsive to determining that at least one of the functions of the first source code was compiled by the at least one compiler module to be changed by the update for the compiler, determining, by the processor, that the first source code of the first computer program is a candidate to be recompiled with an updated version of the compiler having the update for the compiler applied.

DETAILED DESCRIPTION

Figure 1:
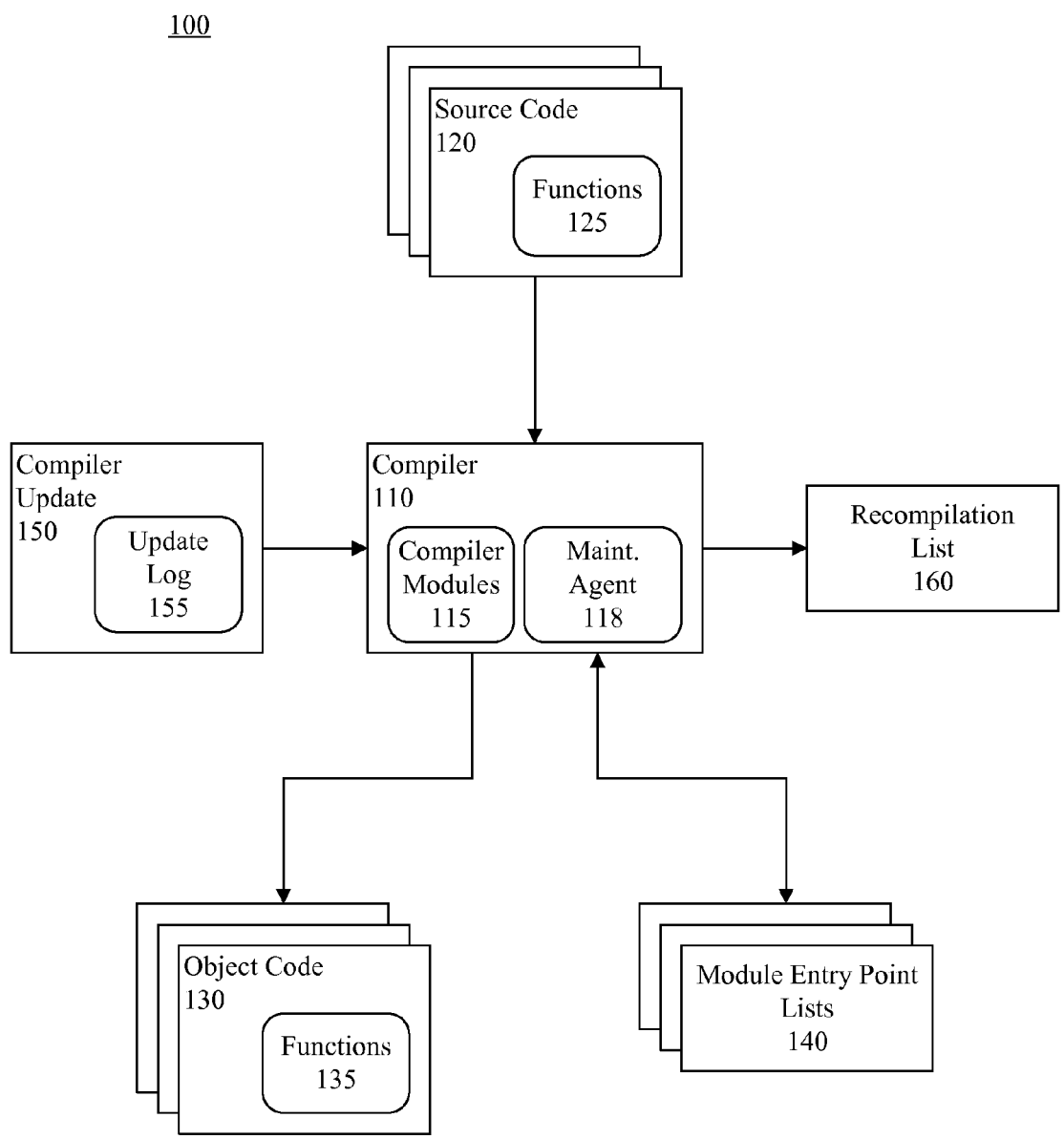
FIG. 1 is a block diagram illustrating an example of a computing environment.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to computer programming, and more specifically, to compilation of program code. In accordance with the inventive arrangements disclosed herein, a compiler can be used to compile source code and output corresponding object code for a plurality of computer programs. For each of the computer programs, a maintenance agent can generate a module entry point list. While the compiler transforms the source code into object code, the maintenance agent can create in the module entry point list an entry (e.g., a record) for each function of the source code that is processed by the compiler to generate corresponding object code. Each record can include an identifier that identifies the respective function.

The compiler may be updated from time to time, for example to repair defects in compiler modules. In the case that defects are present in any of the compiler modules, such defects may have resulted in defects being present in the object code generated by the compiler. Accordingly, it may be desirable to recompile the corresponding source code with the updated compiler to correct any such defects. At this point it should be noted that a particular instance of a compiler may have been used to compile source code for hundreds, if not thousands, of computer programs. This is especially true in large organizations using enterprise level database systems use to manage various aspects of operations. In such systems, it is not uncommon to have a very large number of individual computer programs configured to store, update and retrieve data in such systems. To recompile each of the computer programs every time an update for the compiler is received can be an arduous task.

Typically, not every computer program is affected by the compiler update; some computer programs may not include any functions compiled by modules of the compiler being updated. Nonetheless, some programs may include such functions. The arrangements described herein improve computer functionality by having the computer automatically identify those computer programs which include functions affected by the compiler update. Specifically, when an update to a compiler is received, information indicating which modules of the compiler that have been updated also can be received. For each computer program, this information can compared to the module entry point list to determine whether any functions of the computer program are affected by the update. The computer programs affected by the update can be identified, and indicated in a list of computer programs affected by the update, thus indicating that these computer programs are candidates to be recompiled with the updated version of the compiler. Computer programs not affected by the update need not be included in the list, or can be indicated in the list as not needing to be recompiled. Thus, by reviewing the list, a system administrator readily can identify those computer programs that should be recompiled after the updates are applied to the compiler. Since the system administrator need not be concerned with recompiling source code for computer programs not affected by the compiler update, there is a significant reduction in the amount of labor and computer resources required to ensure all computer programs are up to date.

Several definitions that apply throughout this document now will be presented.

As defined herein, the term "computer program" means a list of computer instructions written to perform a particular task in a processing system. A computer program includes one or more functions (e.g., operations, methods, etc.). A computer program can be a stand-alone computer program, or a component of a larger set of computer programs. For example, a computer program can be a component or module in software that includes a plurality of computer programs. In illustration, database systems oftentimes include a large number of modules, each of which is a computer program and configured to perform a particular task in a database system.

As defined herein, the term "compiler" means a computer program, a set of computer programs, hardware (e.g., a Field Programmable Gate Array (FPGA) or Application-specific integrated circuit (ASIC)) executing firmware and/or software, or other software and/or hardware configured to transform source code written in a computer programming language into object code.

As defined herein, the term "compiler module" means an operable unit of a compiler. An example of a compiler module is a compiler function. A compiler includes a plurality of compiler modules. Some of these may be individual executable files, though this need not be the case. Indeed, a particular executable file may include a plurality of compiler modules. Many of these compiler modules are specifically configured to compile certain types of functions contained in source code. For example, compiler modules can be configured to perform specific functions/processes during BIND or REBIND processing of source code used for database operations.

As defined herein, the term "compile" means to transform source code into object code. BIND and REBIND are examples of such transformation, though the present arrangements are not limited in this regard.

As defined herein, the term "source code" means a collection of computer instructions written using a human-readable computer language (e.g., a high-level programming language) configured to be transformed into object code.

As defined herein, the term "object code" means a sequence of statements or instructions written in machine code language (i.e., 1's and 0's) or an intermediate language such as register transfer language (RTL).

As defined herein, the term "update" means software and/or firmware configured to be applied to a compiler to change the manner in which a compiler compiles source code. In the case that a compiler is a computer program or set of computer programs, an update can be applied, for example, as a patch to the computer program(s) or as a new version (or versions) of the computer program(s). In the case that the compiler is hardware executing firmware, an update can be applied, for example, as a patch to firmware or as a new version of firmware, or applied by replacing the hardware with new hardware.

As defined herein, the term "maintenance level" means a representation of a current status of at least one compiler module with respect to updates that have been applied to the compiler. In illustration, the maintenance level of a particular compiler module can indicate whether that module has been updated since the compiler, or a particular version of the compiler, was implemented and/or indicate the most recent update applied to the compiler that changed software and/or firmware defining operation of the particular module.

As defined herein, the term "updated version" means a version of a compiler that has been updated or a new version of the compiler that replaces a previous version.

As defined herein, the term "function" means a particular part of a computer program that performs a specific task.

As defined herein, the term "module entry point list" means a functional data structure, automatically generated responsive to compiling source code using a compiler, indicating particular functions of source code compiled by compiler modules of the compiler.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a programmable logic array (PLA), a FPGA, an ASIC, programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "output" means storing in memory elements, writing to display, printer or other peripheral output device, sending or transmitting to another system, exporting, or the like.

As defined herein, the term "user" means a person (i.e., a human being).

FIG. 1 is a block diagram illustrating an example of a computing environment (hereinafter "environment" 100). The environment 100 can include a compiler 110 configured to compile source code 120 to generate corresponding object code 130. Specifically, the compiler 110 can transform the source code 120 to object code 130. The compiler can be implemented as one or more computer programs executed by a processor of a processing system, as a hardware (e.g., a FPGA or ASIC) executing firmware and/or software, or implemented as any other suitable combination of hardware and firmware/software.

The compiler 110 can include a plurality of compiler modules 115. The various compiler modules 115 each can be configured to compile one or more specific types of functions 125 of the source code 120 to generate corresponding functions 135 in the object code 130. For example, if the source code 120 is written in structured query language (SQL), the source code 120 may include create record functions, create table functions, table join functions, select records functions, etc. Various compiler modules 115 can be configured to transform the source code of the various functions 125 to corresponding functions 135 in the object code 130. The compiler modules 115 can be, for example, modules that perform BIND and REBIND operations following application of database maintenance.

SQL is but one example of a language in which the source code 120 may be written, and the present arrangements are not limited in this regard. Indeed, the source code 120 can be written in any high-level programing language, examples of which include, but are not limited to, C, C++, Cobal, Fortran, Visual Basic, Delphi, Perl, PHP, ECMA script, RUM PL/I, RPG, Ruby, Java™, .NET CLI, etc.

Responsive to compiling a particular source code 120, the compiler 110, for example a maintenance agent 118 of the compiler 110, can create entries in a corresponding module entry point list 140. For example, when compilation of the source code 120 is initiated, the maintenance agent 118 can generate the corresponding module entry point list 140. As the compiler 110 processes the functions 125 in the source code 120 to generate corresponding functions 135 for the object code 130, the maintenance agent 118 can, in real time, automatically create corresponding entries in a module entry point list 140. The module entry point list 140 can be a data table, a data file, or any other functional data structure suitable for storing information related to the compiler modules 115 and functions 125. Table 1 is an example of entries made in a module entry point list 140 responsive to the source code 120 being compiled by the compiler 110.

TABLE 1

| Function Compiled | Compiler Module | Maintenance Level | Date Code |
|---|---|---|---|
| Join | JoinsA | 3.3.0.1 | 2/12/14 |
| Select | SeclectsD | 3.1.1.3 | 8/10/13 |
| ... | ... | ... | ... |
| Set Parameters | SetParams | 3.1.2.1 | 12/15/13 |

The module entry point list 140 can include a column, for example a "Function Compiled" column, in which identifiers are entered indicating each of the functions 125 compiled by the compiler 110. The module entry point list 140 optionally can include a column, for example a "Compiler Module" column, in which identifiers are entered for each of the compiler modules 115 used to compile the respective functions 125 of the source code 120, which are identified in the "Function compiled" column. In the case that the compiler modules are identified in the module entry point list 140, the module entry point list 140 optionally can include a column, for example a "Maintenance Level" column, in which identifiers are entered indicating the maintenance level for each of the respective compiler modules 115. The module entry point list 140 also optionally can include a column, for example a "Date Code" column, in which identifiers are entered indicating the dates each of the respective compiler modules 115 were compiled. The maintenance levels and date codes for each of the compiler modules 115 used can be retrieved from a master list of compiler modules 115 accessed by the compiler 110. The master list can be a previously received update log 155, which will be described, or can be a list updated each time a new update log 155 is received. In one arrangement, the master list can be contained in the executable package of the compiler 110.

Optionally, a column for individual record numbers (not shown) also can be provided in the module entry point list 140. Further, in addition to the example entries shown in Table 1, the module entry point list 140 also can include an identifier indicating the source code that is compiled 120, an identifier indicating the maintenance level and/or version of the source code 120 being compiled, and an identifier indicating the maintenance level and/or version of the compiler 110 being used to perform the source code transformation. Such information can be contained in a record, header, footer or metadata of the module entry point list 140, or included elsewhere in the module entry point list 140. Any other information related to the source code 120, functions 125, object code 130, compiler 110 and/or compiler modules 115 also can be included in, or otherwise associated with, the module entry point list 140, and the present arrangements are not limited in this regard.

In an arrangement in which the module entry point list 140 lists the compiler modules, the module entry point list 140 can be configured to indicate a correspondence between each compiler module 115 and each of the functions 125 compiled by the compiler module 115. For example, the first time a compiler module 115 is used to compile a function 125 in the source code 120, an entry for that compiler module 115 can be created in the module entry point list 140. That entry can indicate the compiler module 115 and that first function 125. The next time the same compiler module 115 is used to compile another function 125, that other function can be added to that entry, and so on. Accordingly, the module entry point list 140 can indicate a one-to-many correspondence between the compiler modules 115 and the functions 125. In another arrangement, the module entry point list 140 can be configured with a one-to-one correspondence between each function 125 compiled and each compiler module 115 used to compile that function 125. Still, the module entry point list 140 can be configured in any manner suitable for identifying which compiler modules 115 are used to compile the source code 120 and the present arrangements are not limited in this regard.

For each computer program for which source code 120 is compiled by the compiler 110, the corresponding module entry point list 140 that is created can be stored with the object code 130. For example, the module entry point list 140 can be stored as a data table or other data file stored with the object code 130 in a manner that associates the module entry point list 140 with the computer program. In illustration, text can be added to the object code 130 identifying the corresponding module entry point list 140. In other arrangements, the module entry point list 140 can indicate the corresponding object code 130 and build date, or the module entry point list 140 can be stored in a library or file associated with the object code 130. The object code 130 and module entry point list 140 can be stored to a suitable computer readable storage medium, for example as an executable computer program package.

The above process can be performed each time source code 120 is compiled by the compiler 110. Accordingly, each time object code 130 is generated by the compiler 110, a corresponding module entry point list 140 can be created and associated with the object code 130.

The compiler 110 may be updated from time-to-time, for example with maintenance updates and/or new compiler versions. Accordingly, an update for the compiler (compiler update) 150 can be provided. In the case that the compiler 110 is software executed by a processor, the compiler update 150 can be provided as software to patch, update or replace the compiler 110. In the case that the compiler 110 is hardware (e.g., a FPGA or ASIC), the compiler update 150 can be provided as firmware to patch, update or replace firmware executed by the hardware, as software to patch, update or replace software executed by the hardware and/or as new hardware to replace the existing compiler 110.

The compiler update 150 can include, or can be provided with, an update log 155. The update log 155 can be a data table, a data file, or any other functional data structure suitable for storing information related to the compiler updates 150. Table 2 is an example of entries contained in an update log 155.

TABLE 2

| Compiler Module | Maintenance Level | Date Code | APAR No. | PTF No. | Target Functions |
|---|---|---|---|---|---|
| JoinsA | 3.3.0.1 | 2/12/14 | 1296 | 560 | Joins |
| SeclectsD | 3.1.1.3 | 8/10/13 | | | Selects |
| ... | ... | ... | ... | ... | |
| SetParams | 3.1.2.1 | 12/15/13 | 1315 | 565 | Set Parameters |

The update log 155 can include a column, for example a "Compiler Module" column, in which identifiers are entered for each of the compiler modules 115 of the compiler 110. The update log 155 also can include a column, for example a "Maintenance Level" column, in which identifiers are entered indicating the maintenance level for each of the respective compiler modules 115. The update log 155 also can include a column, for example a "Date Code" column, in which identifiers are entered indicating the dates each of the respective compiler modules 115 were compiled. The update log 155 further can include a column, for example a "Target Functions" column, in which identifiers are entered for each type of function the respective compiler modules 115 are configured to compile.

Optionally, the update log 155 also can include a column, for example an "APAR No." column, in which identifiers are entered for each compiler module 115, changed by the compiler update 150, for which recompilation of source code 120 is required to implement a fix addressed by the change. For example, if a compiler module 115 has a problem that leads to incorrect results or abnormal program termination due to functions 125 compiled by the compiler module 115, a corresponding identifier can be included in the update log 155. The identifier can include, for example, an authorized program analysis report (APAR) number for the compiler module 115. The update log 155 also optionally can include a column, for example a "PTF No." column, in which identifiers are entered for a program temporary fix (PTF) number corresponding to the APAR number. In one arrangement, an APAR and PTF numbers need not be provided for compiler modules 115 not being changed by the current compiler update 150, though this need not be the case.

Optionally, a column for individual record numbers (not shown) also can be provided in the update log 155. The update log 155 also can include an identifier (not shown) indicating the particular compiler update 150, for example a maintenance level or version of the compiler update. Such identifier can be included in a record, header, footer or metadata of the update log, or included elsewhere in the update log 155. Any other information related to the compiler update 150, the compiler 110 and/or compiler modules 115 also can be included in the update log 155, and the present arrangements are not limited in this regard.

Responsive to the compiler update 150 being received as a suggested update for the compiler 110, the maintenance agent 118, or another application, service or agent, can access the update log 155 to determine which source code 120 should be recompiled after the compiler update 150 is applied. For example, the maintenance agent 118 can perform a join operation on the update log 155 and each module entry point list 140 that is associated with a respective object code 130. Based on results of the join operations, the maintenance agent 118 can identify each module entry point list 140 that indicates functions 125 of corresponding source code 120 compiled by compiler modules 115 that will be updated by the compiler update 150.

In illustration, for each module entry point list 140, the maintenance agent 118 can compare the functions 125 indicated in the module entry point list 140 to the target functions indicated in the update log 155 to identify identifying functions 125 indicated in the update log 155 that are also indicated in the module entry point list 140. Compiler modules 115 indicated in the update log 155 that are used to compile the functions 125 contained in the source code 120 can be identified. For each of the compiler modules in the update log 155 that are identified, the maintenance agent 118 can determine whether the compiler module is updated by the compiler update 150. For example, in one arrangement, the maintenance agent 118 can, based on the update log entries, determine whether an indicator that recompilation of source code 120 is required (e.g., APAR or PTF identifier) is associated with any of the identified compiler modules. If, for at least one of the identified compiler modules 115, the update log 155 includes a corresponding identifier indicating the compiler module is changed by the compiler update 150, the source code 120 corresponding to the module entry point list 140 can be selected as a candidate to be recompiled.

In an arrangement in which the module entry point list 140 indicates the compiler modules 115 used to compile the source code 120, the maintenance agent 118 can perform a direct comparison of the compiler modules 115 contained in the module entry point list 140 to the compiler modules 115 contained in the update log 155, and identify each compiler module 115 indicated in the update log 155 that also is indicated in the module entry point list 140. The maintenance agent 118 can determine, for each of the identified compiler modules 115, whether the update log includes a corresponding identifier indicating the compiler module 115 is changed by the compiler update 150. If there is such an identifier for at least one of the identified compiler modules 115, the source code 120 corresponding to the module entry point list 140 can be selected as a candidate to be recompiled. In another arrangement, for each of the identified compiler modules 115, the maintenance agent 118 can determine whether the corresponding maintenance level and/or date code indicated in the update log 155 does not match the corresponding maintenance level and/or date code indicated in the module entry point list 140. If there is at least one instance of a match not being found, the source code 120 corresponding to the module entry point list 140 can be selected as a candidate to be recompiled.

Based on one or more of the above processes, the maintenance agent 118 can determine source code 120 affected by the compiler update 150, and determine source code 120 not affected by the compiler update 150. The maintenance agent 118 can generate a recompilation list including identifiers for the source code 120 affected by the compiler update 150, thus indicating that the source code is a candidate to be recompiled. In one arrangement, the recompilation list 160 need not include identifiers for source code 120 not affected by the compiler update 150. In another arrangement, the recompilation list 160 can identify the source code 120 not affected by the compiler update 150 with an indication that such source code 120 is need not be recompiled.

The above process has been described as being implemented by the maintenance agent 118 of the compiler 110 to process the update log 155 and module entry point lists 140 in order to determine which source code 120 should be recompiled after the compiler update 150 is applied. It will be understood, however, that such process can be implemented by another application, service or agent. Nonetheless, a user, such as a system administrator, reviewing the recompilation list 160 will be apprised of which source code 120 should be recompiled after the compiler update 150 is applied to the compiler 110 and which source code 120 are candidates to be recompiled. By knowing which source code 120 should be recompiled, much user time and use of processing resources will be saved. For example, if only ten percent of the source code 120 are candidates to be recompiled, the system administrator need only initiate recompilation on that ten percent of the source code 120. Without such information being readily available, the system administrator may otherwise initiate recompilation on all of the source code 120, which is time consuming and resource intensive.

Moreover, by reviewing the recompilation list 160, the system administrator can identify those fixes to compiler modules 115 contained in the compiler update 150 that apply broadly to a large number of functions 125, and perhaps a large number of source code 120, and identify those fixes that only apply to a small number of functions 125, and thus a small number of source code 120. Accordingly, the system administrator can selectively choose when to apply certain fixes in the compiler update 150 at any particular time. Hence, the system administrator can minimize any negative impact on performance which may occur due to the fixes contained in the compiler update 150 being applied. For example, fixes that impact a small number of source code 120 can be applied during normal operating hours, while fixes that impact a large number of source code 120 can be applied at times when use of the system is relatively low.

In one arrangement, based on the recompilation list 160, the compiler 110 can automatically apply the fixes to the compiler modules 115. In this regard, the compiler 110 can process the recompilation list 160 to determine when to apply each of the individual fixes contained in the compiler update 150, for example based on the considerations previously described. In illustration, the compiler update 150 can be automatically received by the maintenance agent 118, and the maintenance agent 118 can determine when to apply various fixes contained in the compiler update 150. Again, in lieu of being performed by the maintenance agent 118, such process can be performed by another application, service or agent.

Figure 2:
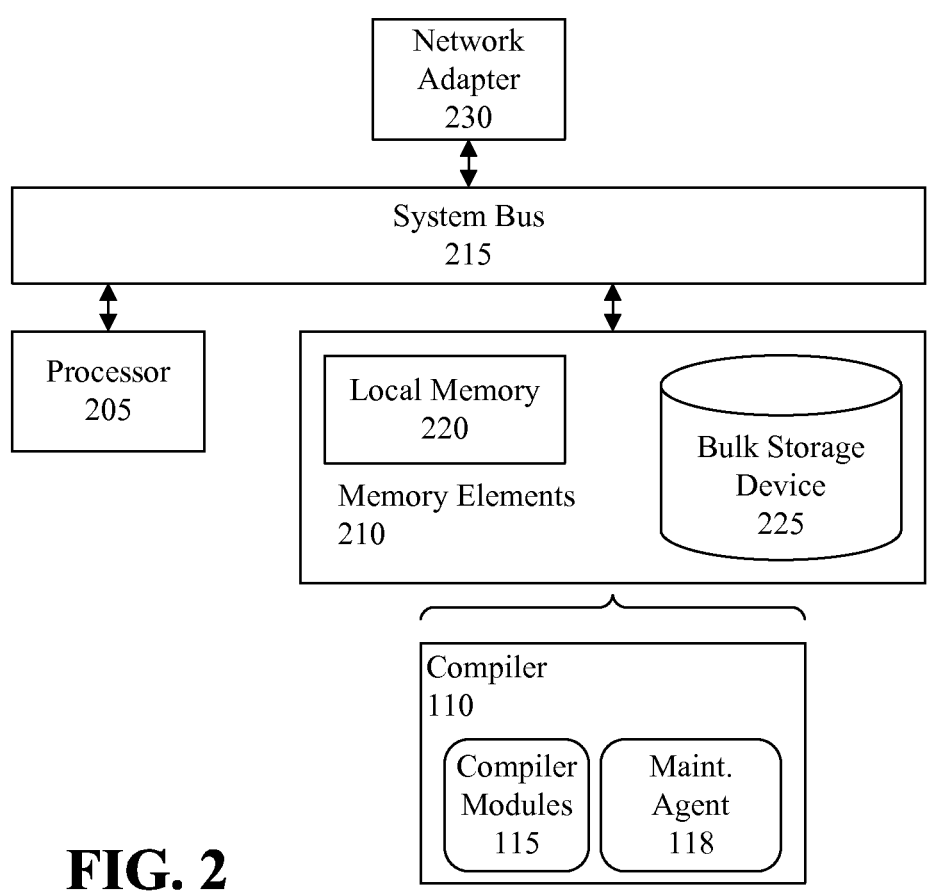
FIG. 2 is a block diagram illustrating example architecture for a data processing system.

FIG. 2 is a block diagram illustrating example architecture for a data processing system 200 configured to automatically determine which computer programs are candidates to be recompiled after application of updates to a compiler. The processing system 200 can include at least one processor 205 coupled to memory elements 210 through a system bus 215 or other suitable circuitry. As such, the processing system 200 can store program code within the memory elements 210. The processor 205 can execute the program code accessed from the memory elements 210 via the system bus 215. It should be appreciated that the processing system 200 can be implemented in the form of any system including a processor and memory that is capable of performing the functions and/or operations described within this specification. For example, the processing system 200 can be implemented as a computer, a workstation, a mobile computer, a laptop computer, a tablet computer, a smart phone, a personal digital assistant, a gaming device, an appliance, and so on.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as a hard disk drive (HDD), solid state drive (SSD), or other persistent data storage device. The processing system 200 also can include one or more cache memories (not shown) that provide temporary storage of at least some program code in order to reduce the number of times program code must be retrieved from the bulk storage device 225 during execution.

One or more network adapters 230 can be coupled to processing system 200 to enable processing system 200 to become coupled to other systems, computer systems, remote printers, and/or remote storage devices through intervening private or public networks. Modems, cable modems, transceivers, and Ethernet cards are examples of different types of network adapters 230 that can be used with the processing system 200.

As pictured in FIG. 2, the memory elements 210 can store the components of the computing environment 100 of FIG. 1, namely the compiler 110, compiler modules 115 and maintenance agent 118. Being implemented in the form of executable program code (e.g., as software and/or firmware), these components can be executed by the processing system 200 and, as such, can be considered part of the processing system 200. Moreover, the source code 120, module entry point lists 140, compiler update 150 and update log 155 of FIG. 1 are functional data structures that may be stored, at least temporarily, in the memory elements 210. As such, these components can be considered part of the processing system 200 when stored in the memory elements 210. The source code 120, module entry point lists 140, compiler update 150 and update log 155 are functional data structures that impart functionality when processed by processing system 200 of FIG. 2 using the compiler 110 and/or maintenance agent 118.

Figure 3:
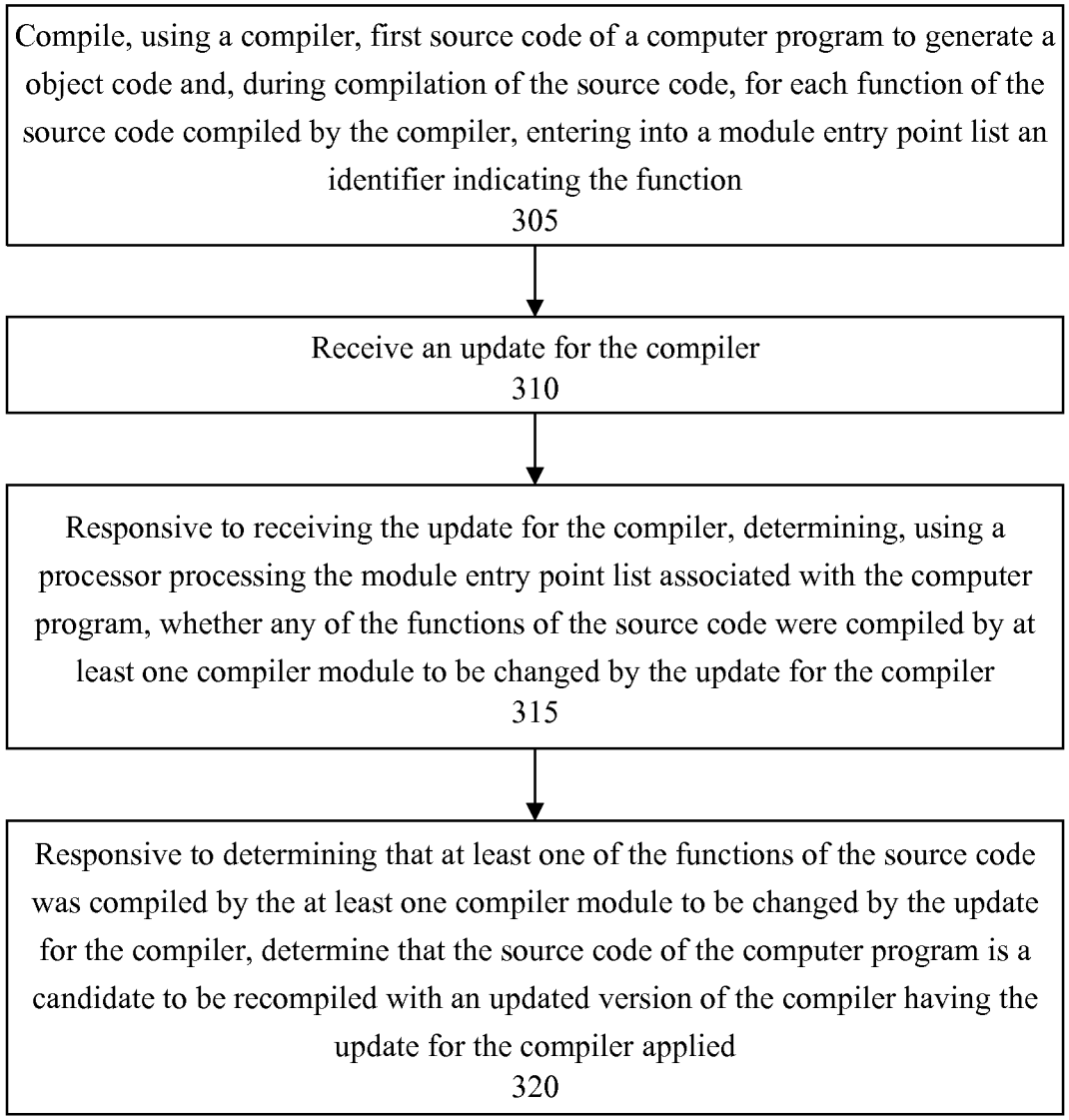
FIG. 3 is a flow chart illustrating an example of a method of automatically determining which computer programs are candidates to be recompiled after application of updates to a compiler.

FIG. 3 is a flow chart illustrating an example of a method 300 of automatically determining which computer programs are candidates to be recompiled after application of updates to a compiler. At step 305, a source code of a computer program can be compiled, using a compiler, to generate object code. During compilation of the source code, for each function of the source code compiled by the compiler, an identifier indicating the function can be entered onto a module entry point list. Step 305 can be repeated at any time for any number of other computer programs. In this regard, a module entry point list can be generated for each of the programs for which source code is compiled by the compiler.

At step 310, an update for the compiler can be received. At step 315, responsive to receiving the update for the compiler, a determination can be made, using a processor processing the module entry point list associated with the computer program, whether any of the functions of the source code were compiled by the at least one compiler module to be changed by the update for the compiler. Step 315 can be repeated for each of the computer programs that were compiled at step 305.

For some computer programs, a determination will be made that at least one function of the source code was compiled by the at least one compiler module to be changed by the update for the compiler. At step 320, for each such computer program, responsive to determining that at least one of the functions of the source code was compiled by the at least one compiler module to be changed by the update for the compiler, a determination can be made that the source code of the computer program is a candidate to be recompiled with an updated version of the compiler having the update for the compiler applied. This determination can be made for each of the computer programs for which at least one function of the source code was compiled by the at least one compiler module to be changed by the update for the compiler.

For some computer programs, a determination will be made that none of the functions of the source code were compiled by the at least one compiler module to be changed by the update for the compiler. For each these computer program, responsive to determining that none of the functions of the source code were compiled by the at least one compiler module to be changed by the update for the compiler, a determination can be made that the source code of the computer program is not a candidate to be recompiled with the updated version of the compiler having the update for the compiler applied. This determination can be made for each of the computer programs for which none of the functions of the source code were compiled by the at least one compiler module to be changed by the update.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
compiling, using a compiler, a first source code of a first computer program to generate a first object code and, during compilation of the first source code, for each function of the first source code compiled by the compiler, entering into a first module entry point list an identifier indicating the function;
receiving an update for the compiler;
responsive to receiving the update for the compiler, determining, using a processor processing the first module entry point list associated with the first computer program, whether any of the functions of the first source code were compiled by at least one compiler module to be changed by the update for the compiler; and
responsive to determining that at least one of the functions of the first source code was compiled by the at least one compiler module to be changed by the update for the compiler, determining that the first source code of the first computer program is a candidate to be recompiled with an updated version of the compiler having the update for the compiler applied.

2. The method of claim 1, further comprising:
responsive to determining that the first source code of the first computer program is a candidate to be recompiled with an updated version of the compiler, outputting a recompilation list indicating that the first source code of first computer program is the candidate to be recompiled.

3. The method of claim 1, further comprising:
compiling, using the compiler, a second source code of a second computer program to generate a second object code and, during compilation of the second source code, for each function of the second source code compiled by the compiler, entering into a second module entry point list an identifier indicating the function;
responsive to receiving the update for the compiler, determining, using a processor processing the second module entry point list associated with the second computer program, whether any of the functions of the second source code were compiled by the at least one compiler module to be changed by the update for the compiler; and
responsive to determining that none of the functions of the second source code were compiled by the at least one compiler module to be changed by the update for the compiler, determining that the second source code of the second computer program is not a candidate to be recompiled with the updated version of the compiler.

4. The method of claim 3, further comprising:
responsive to determining that the first source code of the first computer program is a candidate to be recompiled with an updated version of the compiler and determining that the second source code of the second computer program is not a candidate to be recompiled with the updated version of the compiler, outputting a recompilation list indicating which source code, including the first source code of first computer program, is the candidate to be recompiled.

5. The method of claim 1, further comprising:
receiving an update log for the update for the compiler, the update log including a respective identifier for each compiler module of the compiler, a corresponding identifier for each compiler module indicating at least one type function the compiler module is configured to compile and, for each compiler module of the compiler changed by the update for the compiler, a corresponding identifier indicating the compiler module is changed;
wherein determining whether any of the functions of the first source code were compiled by the at least one compiler module to be changed by the update for the compiler comprises:
identifying functions indicated in the update log that are also indicated in the module entry point, list;
identifying compiler modules in the update log that correspond to the identified functions; and
determining, for each of the identified compiler modules, whether the update log includes the corresponding identifier indicating the compiler module is changed by the update for the compiler.

6. The method of claim 1, further comprising:
during the compilation of the first source code, for each function listed in the first module entry point list, entering into the first module entry point list an identifier indicating a compiler module of the compiler used to compile that function; and
receiving an update log for the update for the compiler, the update log including a respective identifier for each compiler module of the compiler and, for each compiler module of the compiler changed by the update for the compiler, a corresponding identifier indicating the compiler module is changed by the update for the compiler;
wherein determining whether any of the functions of the first source code were compiled by the at least one compiler module to be changed by the update for the compiler comprises: identifying compiler modules indicated in the update log that are also indicated in the module entry point list;
determining, for each of the identified compiler modules, whether the update log includes the corresponding identifier indicating the compiler module is changed by the update for the compiler.

7. The method of claim 1, further comprising:
during the compilation of the first source code, for each function listed in the first module entry point list, entering into the first module entry point list an identifier indicating a compiler module of the compiler used to compile that function and a corresponding identifier for each compiler module indicating a maintenance level or date code of the compiler module used to compile that function; and
receiving an update log for the update for the compiler, the update log including a respective identifier for each compiler module of the compiler, a corresponding identifier for each compiler module indicating at least one type function the compiler module is configured to compile, and a corresponding identifier for each compiler module indicating a maintenance level or date code of the compiler module;
wherein determining whether any of the functions of the first source code were compiled by the at least one compiler module to be changed by the update for the compiler comprises: identifying compiler modules indicated in the update log that are also indicated in the module entry point list;
determining, for each of the identified compiler modules, whether the corresponding maintenance level or date code indicated in the update log does not match the corresponding maintenance level or date code indicated in the first module entry point list.

8. A system, comprising:
a processor programmed to initiate executable operations comprising:
compiling, using a compiler, a first source code of a first computer program to generate a first object code and, during compilation of the first source code, for each function of the first source code compiled by the compiler, entering into a first module entry point list an identifier indicating the function;
receiving an update for the compiler;
responsive to receiving the update for the compiler, determining, by processing the first module entry point list associated with the first computer program, whether any of the functions of the first source code were compiled by at least one compiler module to be changed by the update for the compiler; and
responsive to determining that at least one of the functions of the first source code was compiled by the at least one compiler module to be changed by the update for the compiler, determining that the first source code of the first computer program is a candidate to be recompiled with an updated version of the compiler having the update for the compiler applied.

9. The system of claim 8, the executable operations further comprising:
responsive to determining that the first source code of the first computer program is a candidate to be recompiled with an updated version of the compiler, outputting a recompilation list indicating that the first source code of first computer program is the candidate to be recompiled.

10. The system of claim 8, the executable operations further comprising:
compiling, using the compiler, a second source code of a second computer program to generate a second object code and, during compilation of the second source code, for each function of the second source code compiled by the compiler, entering into a second module entry point list an identifier indicating the function;
responsive to receiving the update for the compiler, determining, using a processor processing the second module entry point list associated with the second computer program, whether any of the functions of the second source code were compiled by the at least one compiler module to be changed by the update for the compiler; and
responsive to determining that none of the functions of the second source code were compiled by the at least one compiler module to be changed by the update for the compiler, determining that the second source code of the second computer program is not a candidate to be recompiled with the updated version of the compiler.

11. The system of claim 10, the executable operations further comprising:
responsive to determining that the first source code of the first computer program is a candidate to be recompiled with an updated version of the compiler and determining that the second source code of the second computer program is not a candidate to be recompiled with the updated version of the compiler, outputting a recompilation list indicating which source code, including the first source code of first computer program, is the candidate to be recompiled.

12. The system of claim 8, the executable operations further comprising:
receiving an update log for the update for the compiler, the update log including a respective identifier for each compiler module of the compiler, a corresponding identifier for each compiler module indicating at least one type function the compiler module is configured to compile and, for each compiler module of the compiler changed by the update for the compiler, a corresponding identifier indicating the compiler module is changed;
wherein determining whether any of the functions of the first source code were compiled by the at least one compiler module to be changed by the update for the compiler comprises:
identifying functions indicated in the update log that are also indicated in the module entry point list;
identifying compiler modules in the update log that correspond to the identified functions; and
determining, for each of the identified compiler modules, whether the update log includes the corresponding identifier indicating the compiler module is changed by the update.

13. The system of claim 8, the executable operations further comprising:
during the compilation of the first source code, for each function listed in the first module entry point list, entering into the first module entry point list an identifier indicating a compiler module of the compiler used to compile that function; and
receiving an update log for the update for the compiler, the update log including a respective identifier for each compiler module of the compiler and, for each compiler module of the compiler changed by the update for the compiler, a corresponding identifier indicating the compiler module is changed by the update for the compiler;
wherein determining whether any of the functions of the first source code were compiled by the at least one compiler module to be changed by the update for the compiler comprises:
identifying compiler modules indicated in the update log that are also indicated in the module entry point list;
determining, for each of the identified compiler modules, whether the update log includes the corresponding identifier indicating the compiler module is changed by the update.

14. The system of claim 8, the executable operations further comprising:
during the compilation of the first source code, for each function listed in the first module entry point list, entering into the first module entry point list an identifier indicating a compiler module of the compiler used to compile that function and a corresponding identifier for each compiler module indicating a maintenance level or date code of the compiler module used to compile that function; and
receiving an update log for the update for the compiler, the update log including a respective identifier for each compiler module of the compiler, a corresponding identifier for each compiler module indicating at least one type function the compiler module is configured to compile, and a corresponding identifier for each compiler module indicating a maintenance level or date code of the compiler module;
wherein determining whether any of the functions of the first source code were compiled by the at least one compiler module to be changed by the update for the compiler comprises:
identifying compiler modules indicated in the update log that are also indicated in the module entry point list;
determining, for each of the identified compiler modules, whether the corresponding maintenance level or date code indicated in the update log does not match the corresponding maintenance level or date code indicated in the first module entry point list.

15. A computer program product comprising a computer readable storage medium having program code stored thereon, the program code executable by a processor to perform a method comprising:
compiling, using a compiler executed by the processor, a first source code of a first computer program to generate a first object code and, during compilation of the first source code, for each function of the first source code compiled by the compiler, entering into a first module entry point list an identifier indicating the function;
receiving, by the processor, an update for the compiler;
responsive to receiving the update for the compiler, determining, by the processor processing the first module entry point list associated with the first computer program, whether any of the functions of the first source code were compiled by at least one compiler module to be changed by the update for the compiler; and
responsive to determining that at least one of the functions of the first source code was compiled by the at least one compiler module to be changed by the update for the compiler, determining, by the processor, that the first source code of the first computer program is a candidate to be recompiled with an updated version of the compiler having the update for the compiler applied.

16. The computer program product of claim 15, the method further comprising:
responsive to determining that the first source code of the first computer program is a candidate to be recompiled with an updated version of the compiler, outputting, by the processor, a recompilation list indicating that the first source code of first computer program is the candidate to be recompiled.

17. The computer program product of claim 15, the method further comprising:
compiling, using the compiler executed by the processor, a second source code of a second computer program to generate a second object code and, during compilation of the second source code, for each function of the second source code compiled by the compiler, entering into a second module entry point list an identifier indicating the function;
responsive to receiving the update for the compiler, determining, by the processor processing the second module entry point list associated with the second computer program, whether any of the functions of the second source code were compiled by the at least one compiler module to be changed by the update for the compiler; and
responsive to determining that none of the functions of the second source code were compiled by the at least one compiler module to be changed by the update for the compiler, determining, by the compiler, that the second source code of the second computer program is not a candidate to be recompiled with the updated version of the compiler.

18. The computer program product of claim 15, the method further comprising:
receiving, by the processor, an update log for the update for the compiler, the update log including a respective identifier for each compiler module of the compiler, a corresponding identifier for each compiler module indicating at least one type function the compiler module is configured to compile and, for each compiler module of the compiler changed by the update for the compiler, a corresponding identifier indicating the compiler module is changed;
wherein determining whether any of the functions of the first source code were compiled by the at least one compiler module to be changed by the update for the compiler comprises:
identifying functions indicated in the update log that are also indicated in the module entry point list;
identifying compiler modules in the update log that correspond to the identified functions; and
determining, for each of the identified compiler modules, whether the update log includes the corresponding identifier indicating the compiler module is changed by the update for the compiler.

19. The computer program product of claim 15, the method further comprising:
during the compilation of the first source code, for each function listed in the first module entry point list, entering, by the processor, into the first module entry point list an identifier indicating a compiler module of the compiler used to compile that function; and
receiving, by the processor, an update log for the update for the compiler, the update log including a respective identifier for each compiler module of the compiler and, for each compiler module of the compiler changed by the update for the compiler, a corresponding identifier indicating the compiler module is changed by the update for the compiler;
wherein determining whether any of the functions of the first source code were compiled by the at least one compiler module to be changed by the update for the compiler comprises:
identifying compiler modules indicated in the update log that are also indicated in the module entry point list;
determining, for each of the identified compiler modules, whether the update log includes the corresponding identifier indicating the compiler module is changed by the update for the compiler.

20. The computer program product of claim 15, the method further comprising:
during the compilation of the first source code, for each function listed in the first module entry point list, entering, by the processor, into the first module entry point list an identifier indicating a compiler module of the compiler used to compile that function and a corresponding identifier for each compiler module indicating a maintenance level or date code of the compiler module used to compile that function; and
receiving, by the processor, an update log for the update for the compiler, the update log including a respective identifier for each compiler module of the compiler, a corresponding identifier for each compiler module indicating at least one type function the compiler module is configured to compile, and a corresponding identifier for each compiler module indicating a maintenance level or date code of the compiler module;
wherein determining whether any of the functions of the first source code were compiled by the at least one compiler module to be changed by the update for the compiler comprises:
identifying compiler modules indicated in the update log that are also indicated in the module entry point list;
determining, for each of the identified compiler modules, whether the corresponding maintenance level or date code indicated in the update log does not match the corresponding maintenance level or date code indicated in the first module entry point list.

* * * * *